3,217,184
TWO POLE SOLID STATE A.C. SWITCH
Richard F. Lach, Hartford, Conn., assignor to United
Aircraft Corporation, East Hartford, Conn., a corporation of Delaware
Filed July 1, 1963, Ser. No. 291,710
5 Claims. (Cl. 307—88.5)

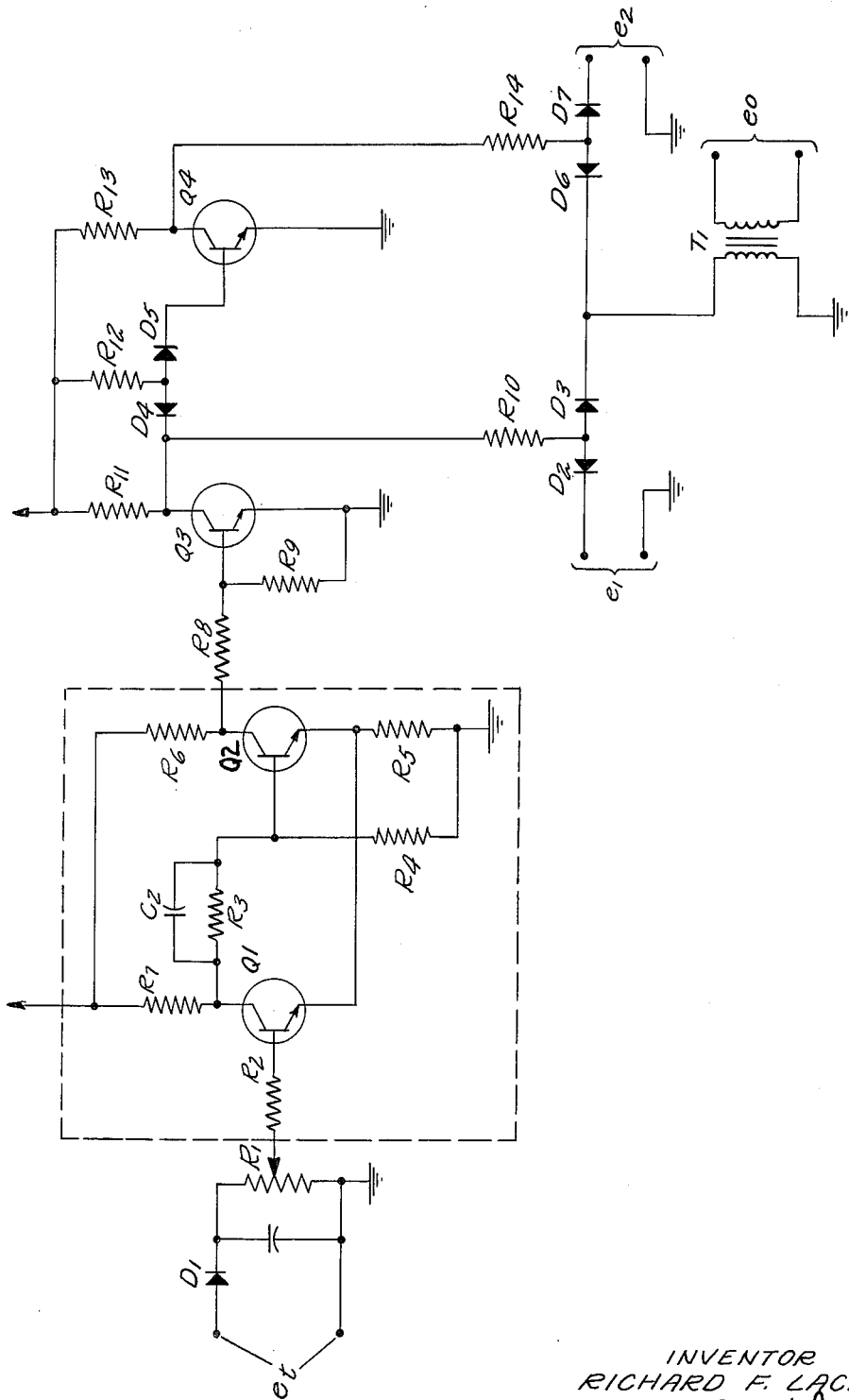

This invention relates to a switching circuit. More particularly, this invention is directed to a solid state two-pole A.C. switch. Switches of this type have wide utility. For example, this invention may be employed in a navigation computer to select between coarse and fine synchro control in a multispeed synchro system. The coarse synchro is employed to avoid the loss of synchronism inherent in a multispeed system; therefore, whenever its output falls below a predetermined minimum value it is switched out of the control loop and the fine synchro is switched into the control loop.

It is an object of this invention to provide an improved switching circuit.

It is another object of this invention to provide a two-pole solid state switch.

These and other objects of this invention are accomplished by novel circuitry which switches either of two A.C. input signals to a common output. The passing of these input signals to the output circuit is controlled by a pair of solid state switches which are selectively rendered conductive under the control of an amplitude discriminating circuit responsive to a control signal input.

This invention may be better understood and its numerous advantages will become apparent to those skilled in the art by reference to the accompanying drawing. In the drawing, a D.C. control signal $e_t$ is applied across the control signal input terminals. It is the magnitude of this control signal which determines which of two A.C. signals, $e_1$ or $e_2$, will be applied across the primary winding of output transformer $T_1$. In operation, whenever the trigger voltage $e_t$ is below a value K, the A.C. input voltage $e_1$ appears across the secondary winding of transformer $T_1$ and whenever $e_t$ is above the value K, the A.C. input voltage $e_2$ appears at the output.

In order to describe the operation of the novel solid state switch which comprises this invention, it will initially be assumed that the trigger voltage $e_t$ is less than a value K. This value of $e_t$, less the voltage drops across a portion of potentiometer $R_1$ and resistor $R_2$, will be applied to the base electrode of transistor Q1. By proper adjustment of the wiper arm of potentiometer $R_1$, values of $e_t$ less than K, when applied to the base of transistor Q1, will be insufficient to cause the transistor to conduct. Transistors Q1 and Q2 along with resistors R2, R3, R4, R5, R6, R7 and capacitor C2 form a Schmitt trigger circuit. Thus, when Q1 is nonconducting, transistor Q2, will be saturated. Therefore, with the trigger voltage $e_t$ below the value K, the collector voltage on transistor Q2 will be very small. Further attenuation of the small collector voltage on transistor Q2 is achieved by resistors R9 and R8 so that insufficient voltage is available at the base electrode of transistor Q3 to cause it to conduct. In the nonconducting mode, the collector voltage on transistor Q3 is very high. This high voltage will be applied through bias resistor R10 to the common anode connection of a solid state switch consisting of a pair of oppositely connected diodes D2 and D3. Diodes D2 and D3 will thus be biased into conduction allowing the input voltage $e_1$ to be transferred into the primary winding of output transformer $T_1$.

When the trigger voltage $e_t$ exceeds the value of K, the Schmitt trigger is fired resulting in transistor Q2 dropping out of saturation and Q1 going into saturation. This voltage amplitude discriminating action, common to Schmitt trigger operation, occurs since the value of $e_t$ applied to the base of transistor Q1 is now sufficiently high to bias Q1 into conduction. With transistor Q2 now shut off, a high collector voltage will appear at its collector electrode. This high collector voltage will cause sufficient current to flow into the base electrode of transistor Q3 driving it into saturation. The collector voltage on Q3 will thus drop to a very low value. Due to the low collector voltage on transistor Q3, diodes D2 and D3 drop out of the conducting mode and block the voltage $e_1$ from the output circuit. At the same time, the low output impedance of saturated transistor Q3 diverts the current from the base of transistor Q4 causing it to drop out of conduction. That is, a current path is provided from the power supply through resistor R12, diode D4 and transistor Q3 to ground. Thus, the collector voltage of transistor Q4 now rises to a high value. The high collector voltage on transistor Q4 is applied through resistor R14 to the common anode connection between oppositely connected diodes D6 and D7 thereby biasing these diodes into conduction. Conduction of diodes D6 and D7 couples input voltage $e_2$ to the output circuit.

In actual operation, the pull-in and drop-out values of trigger voltage $e_t$ are not the same. However, this hysteresis effect is adjustable over certain limits by adjustment of the resistors making up the Schmitt trigger circuit.

The novel switching circuit which comprises this invention has an advantage over the prior art in that the power requirements for triggering the disclosed solid state switch are lower than those of previous switches. Further, the instant invention consists of a two-pole switch where only single pole solid state switches were previously known in the art. It will, of course, be obvious to those skilled in the art that the solid state switch of this invention is advantageous in that there are no moving parts to wear and that the response speed of the switch is faster than mechanical switches.

While a preferred embodiment of this invention has been shown and described, various modifications and substitutions may be made without deviating from the spirit and scope of this invention. Thus, while a preferred embodiment of this invention has been described wherein a Schmitt trigger is utilized, any amplitude discriminating circuit may be employed to produce the switching action. Thus, this invention is described by way of illustration rather than limitation and accordingly it is understood that this invention is to be limited only by the appended claims taken in view of the prior art.

I claim:
1. An electronic circuit for selectively switching one of a plurality of input voltage sources to an output circuit in response to a control signal comprising:
   a first input terminal adapted to be connected to a first input voltage source,
   a second input terminal adapted to be connected to a second input voltage source,
   means responsive to the amplitude of the control signal for generating a first activating signal when the control signal is less than a preselected value and for generating a second activating signal when the control signal exceeds the preselected value,
   at least two oppositely connected diode pairs having each of their common interconnection points electrically responsive to one of said activating signals,
   means for electrically connecting one side of each of the diode pairs to the output circuit,
   means for electrically connecting the first terminal to the remaining unconnected side of one diode pair and the second terminal to the remaining unconnected side of the other diode pair.
2. The apparatus of claim 1 wherein the amplitude responsive means comprises:

a Schmitt trigger circuit responsive to the control voltage, a first transistor amplifier coupled to one side of the Schmitt trigger circuit whereby firing of the trigger circuit will turn on the amplifier, and a second transistor amplifier coupled to the collector circuit of said first amplifier whereby conduction of the first amplifier cuts off the second amplifier and nonconduction of the first amplifier turns on the second amplifier.

3. The apparatus of claim 2 and further comprising:

means coupling the output voltage of said first amplifier to the common interconnection point of one diode pair.

4. The apparatus of claim 3 and further comprising:

means coupling the output voltage of said second amplifier to the common interconnection point of the other diode pair.

5. An electronic circuit for selectively switching one of a plurality of input voltage sources to an output circuit comprising:

a first pair of input terminals adapted to be connected to a first input voltage source, a second pair of input terminals adapted to be connected to a second input voltage source, first switch means connected between said first pair of input terminals and said output circuit, second switch means connected between said second pair of input terminals and said output circuit, a variable control voltage source, means connected to said control voltage source and responsive to the amplitude of the control voltage for generating a first activating signal when the control voltage is less than a preselected value and for generating a second activating signal when the control voltage exceeds the preselected value, means for applying the first activating signal to said first switch means, and means for applying the second activating signal to said second switch means.

References Cited by the Examiner
UNITED STATES PATENTS

| | | | |
|---|---|---|---|
| 2,557,085 | 8/51 | Fisk et al. | 328—154 XR |
| 2,900,504 | 8/59 | Weiss | 328—154 |
| 3,047,741 | 7/62 | Snow | 307—88.5 |
| 3,061,797 | 10/62 | Grenier. | |
| 3,158,692 | 11/64 | Gerkensmeier. | |

DAVID J. GALVIN, *Primary Examiner.*

ARTHUR GAUSS, *Examiner.*